United States Patent Office

3,069,452
Patented Dec. 18, 1962

3,069,452
PROCESS FOR THE PRODUCTION OF A SILANE MIXTURE
Gerd Rossmy, Essen-Huttrop, Germany, assignor to Th. Goldschmidt A.G., Essen, Germany
No Drawing. Filed Jan. 18, 1960, Ser. No. 2,805
Claims priority, application Germany Jan. 26, 1959
12 Claims. (Cl. 260—448.2)

The preferred method used in industry for the production of alkyl(aryl)-halogen silanes (hereinafter called for simplicity's sake alkylhalogen silanes) resides in conducting the respective alkyl-(aryl)-halide (hereinafter called alkyl halide) over a silicon catalyst. The most important used catalyst is copper. Copper can be merely mixed as a powder with the finely divided silicon (and ferrous silicon resp.) or it can be sintered with it. It has also been suggested to use finely ground alloys of silicon and copper for the above mentioned reaction.

The present invention relates to a new type of copper catalyst which permits considerably better yields of alkylhalogen silanes with a reduced copper content in the catalyst and in the reaction mass, and which has beyond that a number of important advantages over conventionally employed catalysts.

The catalyst according to the invention is a brittle, easily grindable silicon-copper alloy. The silicon content of these alloys can vary within the limit of 1–50% by weight, but it is of advantage to work with alloys whose silicon content is 5–25% by weight. Of particular interest are alloys which correspond in their composition approximately to the intermetallic compounds $Cu_3Si$ (12.8% silicon). (When using ferrous silicon there has naturally to be taken into account that a part of the silicon is bound by other elements, for example, iron, magnesium or calcium, therefore more silicon has to be used for the production of the above mentioned alloys.)

The copper-silicon catalysts of the process according to the invention must not be confused with the silicon-copper alloys, that are used according to known processes for the reaction with alkyl halides. These silicon-copper halides contain generally 5–20% by weight copper. They are relatively expensive in the production because the entire silicon destined for the reaction with the alkyl halide has to be molten with copper. Besides, the yields of alkyl-halogen silanes, particularly of the highly desirable dialkyldihalogen-silanes, are as a rule lower when using these alloys than those that can be obtained with sintered silicon-copper contacts.

It is one of the important objects of the present invention to provide a copper-silicon catalyst for the use of which it is only necessary to melt the silicon required for the production of the catalyst, that is, only a small fraction of the silicon that is reacted with the alkyl halide.

The catalyst according to the invention is brittle and can be ground finely with the same device as silicon itself. The catalyst can thus be obtained in a much more economical way in powder form than it is the case with ductile copper. The catalyst according to the invention can be simply mixed with the silicon or it can be subjected to a thermal treatment (hereinafter called sintering) after the mixing. The copper content in the reaction contact in the catalysts according to the invention is as a rule within the customary limits, that is, it varies between 2% and 50%.

It is a further important object of the invention to employ a process in which less copper is required to obtain optimum alkylhalogen silanes with the catalysts according to the invention than with copper powder.

Even with a content of less than 2% copper in the reaction mass, considerable reaction velocities can still be obtained when using the catalysts according to the invention (particularly when using an additional accelerator such as aluminum or zinc). Especially in the sintering process the extraordinary advantages that can be achieved with copper catalysts compared to the present method become quite pronounced. This may be due partly to the fact that the catalysts according to the invention will melt at temperatures of about 800° C., or a little above that. The effect of the catalyst on the silicon starts during the sintering, that is, at lower temperatures than in conventional sintering with silicon- and copper powder.

Another of the important objects of the invention resides in the provision of a catalyst for use with the process of the invention which facilitates the production of a relatively large percentage of desirable dialkylhalogen silanes.

A further object of the invention resides in the provision of a process facilitating the production of alkylhalogen silanes using a catalyst and a reaction mass which may be mixed together in a powdered form.

Yet another object of the invention resides in the provision of a catalyst which may be mixed with the reaction mass of ferrous silicon so as to substantially reduce the amount of copper necessary while also eliminating the necessity of melting the entire reaction mass with the copper.

A further feature of the invention lies in the provision of a process for producing alkylhalogen silanes which may readily employ additional accelerators such as aluminum or zinc for obtaining an increased and highly desirable yield of the resultant silane mixture.

An ancillary object of the invention is to provide a method of forming a catalyst for use in the production of alkylhalogen silanes which is capable of being finely ground and easily added to the reaction mass and then sintered so that the reaction between the reaction mass and the alkylhalogen can be undertaken in a simple manner.

Another advantage of the catalysts according to the invention is that a reducing gas atmosphere (for example, hydrogen, ammonia product gas, etc.) is not absolutely necessary for sintering with silicon. In contrast to the conventional sintering with copper powder, highly reactive contacts are obtained when using a catalyst according to the invention, for example, also in sintering in a nitrogen atmosphere. This is of great importance, since it is possible to use simpler sintering furnaces, which must be excluded for reasons of safety when working with hydrogen-containing gases. The sintering can also be effected in a vacuum.

Another object of the invention is to permit the sintering temperatures to be lower than in conventional sintering processes with copper powder, which means that there is obtained good reaction masses consisting of a silicon and a catalyst according to the invention at temperatures of 500–800° C., but higher temperatures up to about 1250° C., can also be used.

Another very important object of the catalysts employed in the invention is that they permit to introduce accelerators into the reaction contacts in a much more effective and economical way than it was possible up to now.

The advantage of the process according to the invention becomes particularly pronounced when the finely ground catalyst alloy which contains the accelerator is sintered with the silicon. The ease of dosing the amount of the accelerator in the catalyst, combined with a suitable selection of the sintering temperature, makes it possible to guide the reaction as desired in the direction of possibly high yields of dialkyldihalogen silanes, trialkylhalogen silanes or alkyltrihalogen silanes.

The selection of the amount of the accelerator and of the sintering temperature cannot be laid down in rigid rules, since these data depend to a great extent on the specific conditions, such as the reactivity of the silicon used for the reaction with the alkyl halide, as well as of the catalyst-silicon, on the type of the alkyl halide to be reacted with the silicon, on the type of the reaction furnace, etc. But for those skilled in the art, it will be easy to select the optimum conditions from the examples given here in conjunction with the data of the processes belonging to the state of technology (for example, U.S. Pat. Nos. 2,464,033 and 2,427,605).

For example, a larger amount (more than 1%) of zinc in the contact or reaction mass guides the reaction according to the data in the above mentioned patents, in the direction of the formation of trialkylhalogen silanes and alkyltrihalogen silanes, while lower amounts of less than 1% zinc effect the preferred formation of the highly desired dialkylhalogen silanes. If the sintering temperature is so selected with the catalysts according to the invention that the zinc can partly distill off during the sintering, the zinc content in the reaction mass or contact destined for the sintering can also be more than 1% for guiding the reaction in the direction of the dialkylhalogen silanes. In this method, where an extremely good interaction between accelerator and silicon is achieved, we obtain even particularly reactive and selective contacts, as far as the dialkylhalogen-silanes are concerned. In the case of aluminum it is not advisable to use reaction masses with more than 10% aluminum, otherwise the formation of aluminum chloride would appear in the foreground as an annoying side-reaction.

The process according to the invention is described below on the basis of several examples. In view of the great versatility of the process according to the invention, however, these examples must not be construed as limitative.

Thus, methyl chloride is always employed in the tests as the alkyl halide. But naturally other alkyl halides, such as methyl bromide, allyl chloride, isopropyl chloride, can also be used. There has been selected a particularly simple test arrangement; the reaction mass is heated in a cylindrical vertical tube to 300° C., while 18 parts by weight of methyl chloride traverse the contact per hour from the bottom to the top. The tests are continued—unless otherwise mentioned—until no formation of methylchlorosilanes can be observed in a cooler traversed by water. The condensates of the water cooler and of a low-temperature cooler (−50° C.) arranged in series, are combined, liberated of excess methyl chloride by heating to room temperature, and analyzed as usual. The reaction with chlorobenzene, mentioned in Example 14, was carried out in a similar manner. The above described test arrangement, because of its great simplicity, is particularly suitable for demonstrating the process according to the invention.

But naturally it is also possible to use other methods, for example, carrying out the reaction in a turbulence bed or by stirring the contact. The yields of alkyl halogen silanes that can be obtained are then even substantially higher. The same ferrous silicon (94.1% Si) is always used for the reaction with methyl chloride. The catalyst-alloys according to the invention are produced from electrolytic copper, a ferrous silicon with 95.2% by weight Si and, in the given case, pure zinc or aluminum.

The ferrous silicon used for the reaction with methyl chloride and the copper-silicon-(accelerator)-alloys acting as catalysts are ground so fine that 90% of the material are less than 0.055 mm. In copper powder and the pulverized copper-zinc alloy 90% of the material are less than 0.015 mm.

EXAMPLE 1 (Prior Art)

75 parts by weight copper powder are mixed with 425 parts by weight ferrous silicon and then heated in a hydrogen atmosphere for 3 hours to 900° C. 236 parts by weight of this sinter contact (copper content 15%) are reacted in the above described apparatus with methyl chloride. After 70 hours 572 parts by weight of a silane mixture are obtained, which contains 62.8% dimethyl-dichlorosilane (hereinafter called DDS), (359 parts by weight), 16.7% methyl-trichlorosilane (MTS) and 6.4% trimethylchlorosilane (TMS).

EXAMPLE 2 (Prior Art)

The sinter described in Example 1 is repeated with the difference that the sintering is effected in a nitrogen atmosphere. 236 parts by weight of this sinter contact yield in the reaction with methyl chloride in 45 hours 328 parts by weight of a silane mixture with 64.0% DDS (210 parts by weight) 16.9% MTS and 6.2% TMS.

EXAMPLE 3 (Prior Art)

22 parts by weight copper powder are mixed with 228 parts by weight ferrous silicon and then heated in a hydrogen atmosphere for 3 hours to 900° C., 220 parts by weight of this sinter contact (copper content: 8.8%) yield in the reaction with methyl chloride in 23 hours 149 parts by weight of a silane mixture that contains 65.1% DDS (97 parts by weight), 17.2% MTS and 7.7% TMS.

EXAMPLE 4

An alloy is produced from 850 parts by weight of copper and 150 parts by weight ferrous silicon. 44.1 parts by weight of the finely ground alloy and 205.9 parts by weight ferrous silicon are mixed thoroughly and then sintered for 3 hours in a hydrogen atmosphere at 880° C. 236 parts by weight of this sinter contact (copper content 15%), are reacted with methyl-chloride, yielding after 70 hours 689 parts by weight of a silane mixture that contains 57.0% DDS (392 parts by weight), 22.2% MTS and 4.8% TMS.

EXAMPLE 5

The test described in Example 4 is repeated with the difference that the sintering is effected under nitrogen instead of hydrogen. From 236 parts by weight of the sinter contact are obtained in the reaction with methyl chloride after 75 hours 639 parts by weight of a silane mixture containing 60.0% DDS (383 parts by weight), 21.9% MTS and 5.0% TMS.

EXAMPLE 6 (Prior Art)

425 parts by weight ferrous silicon and 75 parts by weight of a pulverized copper-zinc alloy (10% zinc) are mixed thoroughly. The mixture (13.5% copper, 1.5% zinc) is sintered for 3 hours at 880° C. in a hydrogen atmosphere. 236 parts by weight of this sinter contact yield in the reaction with methyl chloride in 75 hours 680 parts by weight of a silane mixture with 67.4% DDS (458 parts by weight), 19.2% MTS and 3.4% TMS.

EXAMPLE 7

An alloy is produced from 780 parts by weight copper, 150 parts by weight ferrous silicon and 70 parts by weight zinc. 88.2 parts by weight of the pulverized alloy are mixed with 411.8 parts by weight ferrous silicon (copper content: 13.7%, zinc content: 1.2%). The mixture is sintered for 3 hours at 700° C. in a hydrogen atmosphere. 236 parts of this sinter contact yield in the reaction with methyl chloride in 45 hours 805 parts by weight of a silane mixture with 44.1% DDS (356 parts by weight), 39.9% MTS and 7.9% TMS.

EXAMPLE 8

The sinter contact described in Example 7, is sintered again in a hydrogen atmosphere for 3 hours at 910° C. In the reaction with methyl chloride we obtain from 236 parts by weight of this sinter contact in 66 hours 676 parts by weight of a silane mixture with 83.0% DDS (561 parts by weight), 13.0% MTS and 1.6% TMS.

EXAMPLE 9

231.2 parts by weight ferrous silicon are mixed thoroughly with 18.8 parts by weight of the copper-zinc alloy (10% zinc) (copper content of the mixture: 6.8%, zinc content: 0.76%), and then sintered in a hydrogen atmosphere for 3 hours at 880° C. 216 parts by weight of this sinter contact yield in the reaction with methyl chloride in 88½ hours 631 parts by weight of a silane mixture with 69.9% DDS (441 parts by weight), 13.7% MTS and 2.0% TMS.

EXAMPLE 10

An alloy is produced from 825 parts by weight copper, 150 parts by weight ferrous silicon and 25 parts by weight zinc. 227.9 parts by weight ferrous silicon are mixed thoroughly with 22.1 parts by weight finely ground alloy (copper content: 7.3%, zinc content: 0.22%) and then sintered for 3 hours at 880° C. in a hydrogen atmosphere. In the reaction with methyl chloride 216 parts by weight of this sinter contact yield in 66 hours 766 parts by weight of a silane mixture with 77.1% DDS (591 parts by weight), 14.7% MTS and 1.8% TMS.

EXAMPLE 11

The sintering described in Example 10, is repeated using nitrogen as a protective gas instead of hydrogen. 216 parts by weight of this sinter contact yield in the reaction with methyl chloride in 70 hours 605 parts by weight of a silane mixture with 75.0% DDS (453 parts by weight), 12.4% MTS and 2.4% TMS.

EXAMPLE 12

14.7 parts by weight of the copper-silicon-zinc alloy described in Example 10 are mixed with 235.3 parts by weight ferrous silicon (copper content of the mixture 4.85%, zinc content: 0.15%), and then sintered at 880° C. for 3 hours in a hydrogen atmosphere. 210 parts by weight of this sinter contact yield in the reaction with methyl chloride still show after 96 hours pronounced marks of the reaction. After 96 hours the reaction yields 661 parts of a silane mixture with 77.3% DDS (423 parts by weight), 10.0% MTS and 2.0% TMS.

EXAMPLE 13

An alloy is produced from 780 parts by weight copper, 150 parts by weight ferrous silicon and 70 parts by weight aluminum. 24 parts by weight of this finely ground alloy are mixed with 226 parts by weight ferrous silicon (copper content of the mixture: 7.5%, aluminum content: 0.67%+0.74%, originating from the ferrous silicon). 218 parts by weight of the mixture, sintered at 900° C. for 3 hours in streaming nitrogen, yield in the reaction with methyl chloride in 69 hours 807 parts of a silane mixture with 53.3% DDS (430 parts by weight), 27.4% MTS and 6.9% TMS.

EXAMPLE 14

An alloy is produced from 920 parts by weight copper and 80 parts by weight ferrous silicon. 50 parts by weight of the ground alloy are mixed with 250 parts by weight ferrous silicon and sintered for 3 hours in a $H_2$-atmosphere at 1050° C. Chlorobenzene vapors (30 parts by weight/hour) diluted with $N_2$ in a ratio of 1:1, are conducted at 460° C. over 250 parts by weight of the contact. After 24 hours the reaction is stopped and a mixture of 45 parts by weight phenylchlorosilanes is isolated from the condensate.

Thus it can be seen that there has been provided according to the invention a process for producing silane mixtures such as a mixture of a relatively large percentage of dimethyl-dichlorosilane together with methyl-trichlorosilane and trimethylchlorosilane by reacting an alkyl-(aryl) halide such as methyl chloride with a reaction mass consisting mainly of ferrous silicon with a catalyst of a finely ground mixture of copper and a silicon and an additional accelerator such as zinc or aluminum.

Various changes and modifications may be made without departing from the spirit and scope of the present invention and it is intended that such obvious changes and modifications be embraced by the annexed claims.

Having thus described the invention what is claimed as new and desired to be secured by Letters Patent is:

1. In a process of reacting pulverized silicon with a member selected from the group consisting of alkyl and aryl halides, the improvement which comprises adding to said silicon, prior to the reaction with said member, a silicon-copper alloy catalyst in powder form, the silicon content of said catalyst being between about 5 to 25%.

2. The improvement of claim 1, wherein said catalyst is added to said silicon in amounts ranging from about 1 to 50%.

3. The improvement of claim 1, wherein the composition of said catalyst substantially corresponds to the compound $Cu_3Si$.

4. In a process of reacting pulverized silicon with a member selected from the group consisting of alkyl and aryl halides, the improvement which comprises adding to said silicon, prior to the reaction with said member, a silicon-copper alloy catalyst in powder form in amounts ranging from 1 to 50% and sintering said catalyst with said silicon prior to said reaction at a temperature not exceeding 1250° C.

5. The improvement of claim 4, wherein said sintering is effected in vacuo.

6. In a process claimed in claim 4, wherein said sintering is effected in an inert gas atmosphere.

7. The improvement of claim 4, wherein the composition of said catalyst substantially corresponds to the compound $Cu_3Si$.

8. In a process of reacting pulverized silicon with a member selected from the group consisting of alkyl and aryl halides, the improvement which comprises adding to said silicon, prior to the reaction with said member, a silicon copper alloy catalyst in powder form in amounts ranging from about 1 to 50%, the silicon content of said catalyst being between about 5 and 25%, said catalyst containing additionally a metallic accelerator selected from the group consisting of zinc and aluminum.

9. The improvement of claim 8, wherein said catalyst and said metallic accelerator are sintered with said silicon prior to the reaction.

10. In a process of reacting pulverized silicon with a member selected from the group consisting of alkyl and aryl halides, the improvement which comprises adding to said silicon, prior to the reaction with said member, a silicon-copper alloy catalyst in powder form, the silicon content of said catalyst being about 5 to 25%, said catalyst containing additionally an accelerator in the form of zinc, the weight ratio of copper to silicon to zinc in the reaction mixture being about 850:150:25.

11. In a process of reacting pulverized silicon with a member selected from the group consisting of alkyl and aryl halides, the improvement which comprises adding to said silicon, prior to the reaction with said member, a silicon-copper alloy in powder form as catalyst, the silicon content of said catalyst being between about 5 to 25% by weight, said catalyst being produced from ferrous silicon.

12. A process for the production of hydrocarbon-substituted halosilanes, which comprises effecting reaction of a member selected from the group consisting of alkyl and aryl halides with a reaction mass containing silicon and a catalyst, said catalyst being a pulverized copper-silicon alloy containing from 5% to 25% by weight of silicon, said reaction mass having a copper content ranging from 1% to 50% by weight.

(References on following page)

References Cited in the file of this patent

UNITED STATES PATENTS

| | | |
|---|---|---|
| 2,241,575 | Barlow | May 13, 1941 |
| 2,427,605 | Hurd | Sept. 16, 1947 |
| 2,464,033 | Gilliam | Mar. 8, 1949 |
| 2,466,412 | Gilliam et al. | Apr. 5, 1949 |
| 2,600,358 | Bolton et al. | June 10, 1952 |
| 2,903,473 | Takami et al. | Sept. 8, 1959 |

FOREIGN PATENTS

| | | |
|---|---|---|
| 901,889 | Germany | Jan. 18, 1954 |

OTHER REFERENCES

Goetzel: "Treatise on Powder Metallurgy," Interscience Publishers, Inc., N.Y., 1950, pp. 670–2.

Trambouze et al.: "Jour. Chimie Phisique," vol. 51, No. 9, September 1954, pp. 505–15.

Trambouze: "Bull. Soc. Chim. France," 1956, pp. 1756–65.

Ito: 5875, July 18, 1956, (Japan, abstracted in Chem. Abstracts, vol. 52 (1958), pp. 11, 922).

Grimm: 9,956, June 15, 1955, (German-East, abstracted in Chem. Abstracts, vol. 52 (1958), pp. 16, 200).

Andrianov et al.: "Izvestia Akad. Nauk, SSSR" (1958), pp. 157–65.